ULTRAVIOLET ABSORPTION SPECTRUM OF MACROMOMYCIN

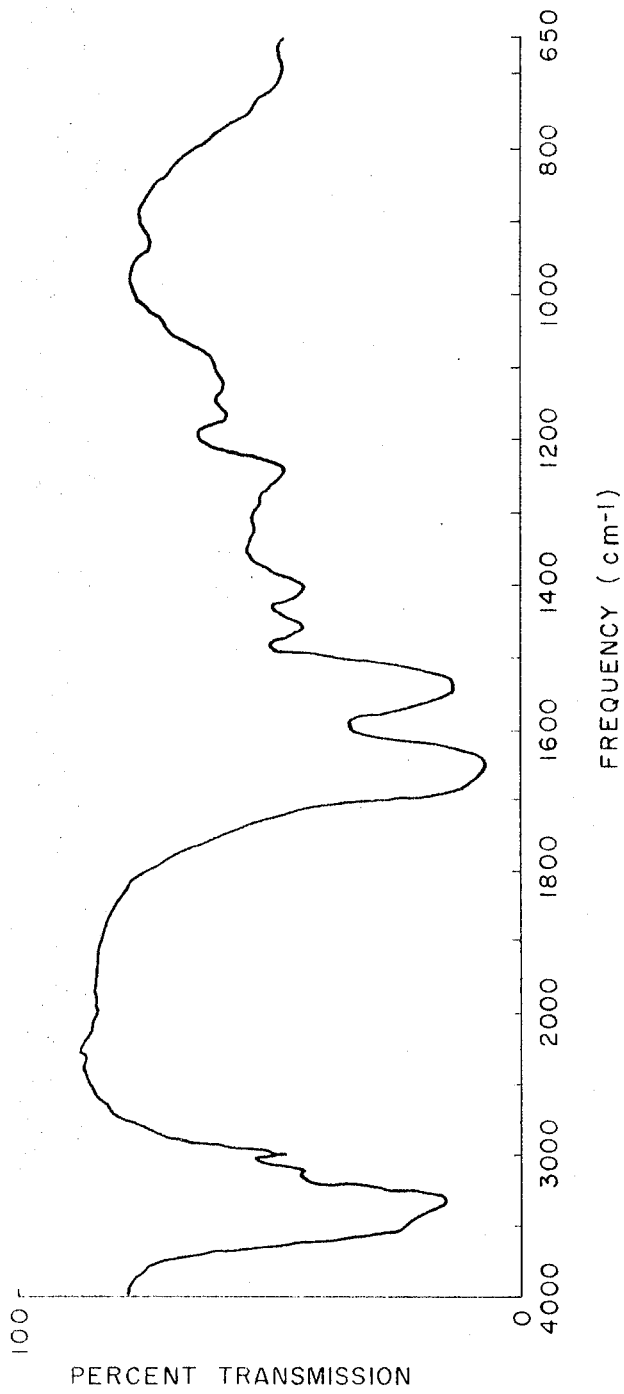
FIG. 2 INFRARED ABSORPTION SPECTRUM OF MACROMOMYCIN IN KBr 3,595,954
ANTIBIOTIC MACROMOMYCIN AND PROCESS FOR MAKING SAME
Hamao Umezawa, 23 Toyotama-kita-2, Nerima-ku; Tomio Takeuchi, 701A New Fujimansion Higashi Gotanda, Shinagawa-ku; Masa Hamada, 1–7–3–4 Fujicho, Hoyashi; Masaaki Ishizuka, 2–3–4 Denenchofu, Ota-ku; Hideo Chimura, 3–17–1–402 Shimo Kita-ku; and Kenji Maeda, 2–3–15 Higashi Gotanda, Shinagawa-ku, all of Tokyo, Japan
Filed Apr. 22, 1968, Ser. No. 723,214
Claims priority, application Japan, May 17, 1967, 42/30,923
Int. Cl. A61k *21/00*
U.S. Cl. 424—117            4 Claims

ABSTRACT OF THE DISCLOSURE

Macromomycin inhibits the growth of various microorganisms e.g., *Staphylococcus aureus* and inhibits the growth of Sarcoma 180 tumor in mice. The antibiotic macromomycin is produced by fermentation of a new species of Streptomyces which has been designated *Streptomyces macromomyceticus*.

BACKGROUND OF THE INVENTION

(1) Field of the invention

This invention relates to a new antibiotic substance and to its production. More particularly, this invention relates to a new antibiotic substance designated macromomycin and to a process for the preparation thereof by fermentation of a new species of Streptomyces designated. *Streptomyces macromomyceticus*. This invention also relates to the recovery and purification of the antibiotic.

(2) Description of the prior art

Various antibiotics are known in the art, however, there exists a need for additional antibiotics.

SUMMARY OF THE INVENTION

There is provided by the present invention the antimicrobial and anti-Sarcoma 180 tumor agent macromomycin. The substance is produced by cultivating a macromomycin-producing strain of *Streptomyces macromomyceticus* in an aqueous carbohydrate solution containing at least one nitrogenous nutrient under submerged aerobic conditions until a substantial quantity of macromomycin is formed in said solution. This invention embraces this antimicrobial and anti-Sarcoma 180 tumor agent in dilute solution, as crude concentrates, as crude solids and as purified solids.

DESCRIPTION OF THE DRAWINGS

FIG. 2 is the infrared absorption spectrum of macromomycin in potassium bromide.

DETAILED DESCRIPTION

Figure 1:
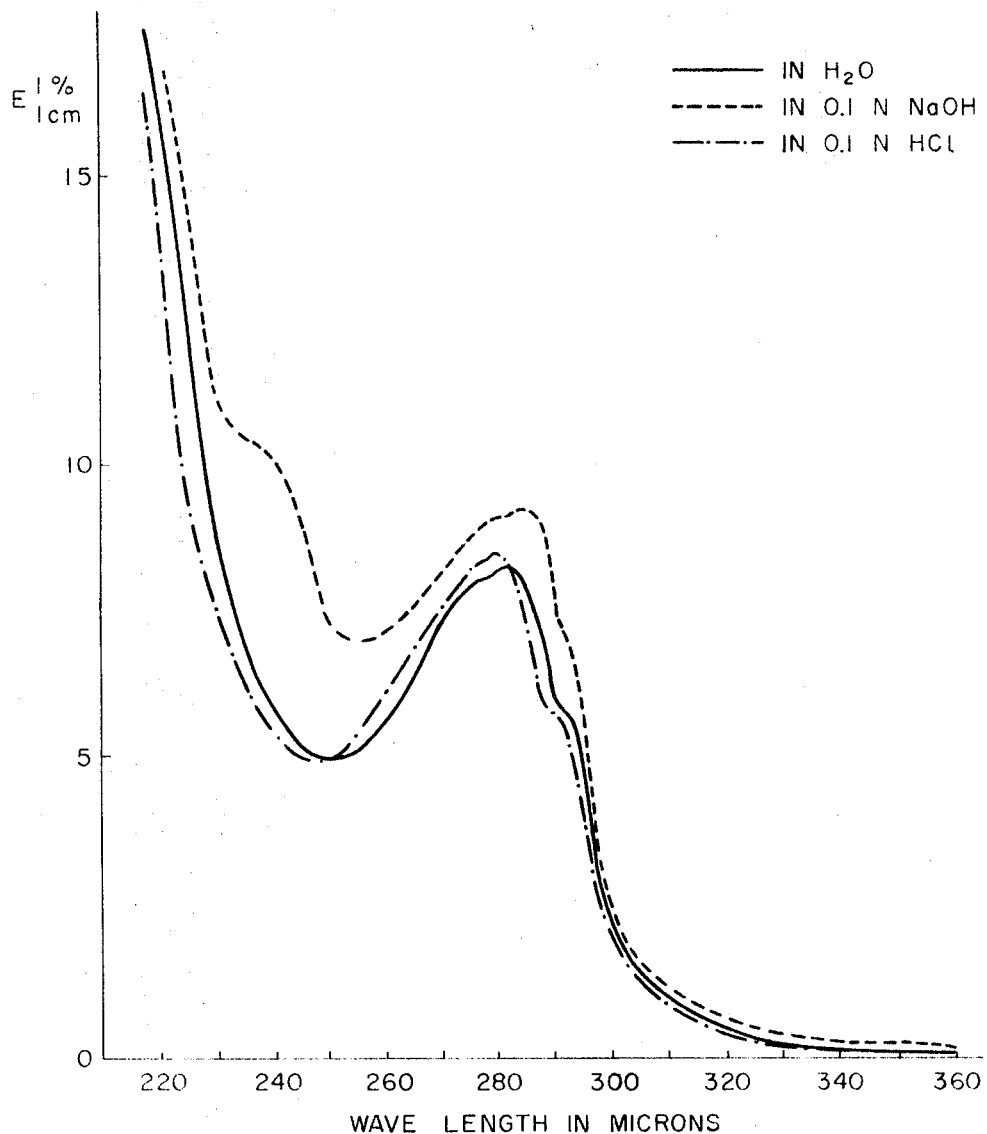
FIG. 1 shows the ultraviolet absorption spectra of macromomycin in $H_2O$, in 0.1 N NaOH and in 0.1 N HCl at 1000 mcg./ml.

Macromomycin inhibits growth of various gram positive bacteria i.e. *Staphylococcus aureus, Sarcina lutea, Micrococcus flavus, Bacillus anthracis, Bacillus cereus* and *Bacillus subtilis*. The substance also inhibits growth of Ehrlich ascites tumor, Sarcoma 180 and leukemia L–1210. The substance is useful in wash solutions for sanitation purposes e.g., for washing hands and disinfecting of various laboratory, dental and medical equipment or other contaminated materials and as a bacteriostatic rinse for laundered clothes. It is also useful to inhibit the growth of Ehrlich ascites tumor, Sarcoma 180 and leukemia L–1210 in mice. The antibiotic substance macromomycin is obtained as a white powder which turned to brown at 240° C. and decomposes at 255–258° C. with foaming, said substance exhibiting dextrorotation ($[\alpha]_D^{20}$ of its 1% aqueous solution +119° C.), being soluble in water but not in organic solvents, exhibiting an absorption maximum of ultraviolet light at 280 m$\mu$ $$(E_{1\,cm.}^{1\%} = 8.2)$$

in aqueous solution, at 284 m$\mu$ $$(E_{1\,cm.}^{1\%} = 9.2)$$

in 0.01 N NaOH solution, and at 278 m$\mu$ $$(E_{1\,cm.}^{1\%} = 8.5)$$

in 0.01 N HCl solution with a shoulder at 290 m$\mu$ in all solutions, exhibiting characteristic absorption bands in the infrared region when pelleted with potassium bromide at the following wave numbers in cm.$^{-1}$: 3350, 3100, 3000, 1660, 1540, 1460, 1400, 1240, 1140, 1100, and 930, decolorizing potassium permanganate solution, giving positive Folin-Lowry, xanthoprotein, Ehrlich, Sakaguchi, and biuret reactions, and weak ninhydrin reaction, and negative anthrone, Benedict, Tollens, Molish and ferric chloride reactions, giving a single pattern of $SW_{20} = 1.27$ by ultracentrifugation of its 0.93% aqueous solution at 59,780 r.p.m. from which a molecular weight of 15,000 is calculated by Archibald's method, having an elemental analysis of C, 43.89; H, 11.55; N, 13.46; S, 2.39; O, 23.76 (no halogen and phosphorus) of which the formula of $(C_{49}H_{153}O_{24}N_{13}S)_{8-10}$ is calculated, being a neutral or weakly acidic polypeptide of which the hydrolysate (6 N HCl, 105° C., 15 hrs.) gives at least 15 ninhydrin positive substances including lysine, histidine, aspartic acid, threonine, serine, glutamic acid, proline, glycine, alanine, cystine, valine, isoleucine, tyrosine and phenylalanine, moving 2.0 and 1.2 cm. to the cathode in barbital buffer of pH 8.6 ($\mu = 0.05$) and in 0.06 M phosphate buffer of pH 6.8 respectively by paper electrophoresis at 450 v. for 4.5 hrs. on a paper of 30 cm. length, being not inactivated by trypsin and chymotrypsin in barbital buffer of pH 8.6 ($\mu = 0.05$) at 27° C. for 24 hrs. in the presence of $Ca^{++}$ ion, being not inactivated by acidic protease in phosphate buffer (pH=6.8, 0.06 M) at 27° C. for 24 hrs. in the presence of $Ca^{++}$ ion, and being inactivated gradually by ultraviolet light irradiation.

There is further provided according to the present invention the process for the production of the antibiotic macromomycin which comprises cultivating a strain of *Streptomyces macromomyceticus* in an aqueous medium containing carbon sources and nitrogen sources under aerobic conditions until a substantial amount of macromomycin is accumulated in said solution. The organism producing the antibiotic of the present invention was isolated from a soil sample collected at Setagaya-ku, Tokyo, Japan and is a new species, designated *Streptomyces macromomyceticus*, of the genus Streptomyces. The culture was given the laboratory designation M480–M1 in our laboratory. A culture of M480–M1 was deposited in the culture collection of the National Institute of Health, Tokyo, Japan and is available therefrom under accession number NIHJ MC–8–42.

The strain No. M480–M1 has the following characteristics: If colonies on Czapek's agar medium containing glycerol as the carbon source are examined microscopically, branched substrate mycelia of about 1$\mu$ in width and long aerial hyphae are observed. Aerial hyphae form neither whorls nor spirals. The surface of the spore is smooth under electron microscopy. The characteristics on various media are described below. The description in parenthesis follows the color standard "Color Harmony Manual" published by Container Corporation of America, U.S.A.

(1) On glycerol Czapek's agar, incubated at 27° C.; Abundant greenish gray (Mistletoe Green 24½ li) growth; white to gray aerial mycelium; no soluble pigment.

(2) On Krainsky's glucose asparagine agar, incubated at 27° C.: Grayish growth; no or white aerial mycelium; no soluble pigment.

(3) On calcium malate agar, incubated at 27° C.: Colorless; white to brownish white aerial mycelium slightly; no soluble pigment; transparent zone around the growth.

(4) In peptone water (with 1.0% sodium nitrate), incubated at 27° C.: Colorless growth; no aerial mycelium; no soluble pigment; reduction of nitrate to nitrite.

(5) On starch plate, incubated at 27° C.: Colorless to grayish growth; abundant brownish gray (Pussywillow Gray 5 dc to Mauve Gray 8 ig) aerial mycelium; no soluble pigment; positive hydrolysis of starch.

(6) On tyrosine agar, incubated at 27° C.: Dark brownish gray growth; white to brownish white aerial mycelium; black soluble pigment; positive tyrosinase reaction.

(7) On potato plug, incubated at 27° C.: Abundant, wrinkled, greenish gray (Mistletoe Green 24½ li) to grayish yellowish brown (Mustard Tan 2 lg) growth; no or brownish white aerial mycelium slightly; brownish soluble pigment.

(8) On nutrient agar, incubated at 27° C.: Colorless to olive-gray growth; no aerial mycelium; no or slight brown soluble pigment.

(9) On nutrient agar, incubated at 37° C.: Colorless growth; no aerial mycelium; no soluble pigment.

(10) On Loeffler's coagulated serum medium, incubated at 37° C.: Wrinkled colorless growth; no aerial mycelium; brownish soluble pigment; no liquefaction of coagulated serum.

(11) On gelatin stab, incubated at 20° C.: Colorless to brownish growth; no aerial mycelium; brown soluble pigment; liquefaction of gelatin in medium, but not strong.

(12) On skimmed milk, incubated at 37° C.: Poor growth; no decomposition.

(13) Utilization of carbohydrates on Pridham-Gottlieb basal medium, incubated at 27° C.: Abundant growth with glycerol, xylose, galactose, glucose, maltose, mannose, dextrin, starch, and salicin; no or slight growth with fructose, lactose, and sucrose; no growth with arabinose, rhamnose, dulcitol, inositol, mannitol, sorbitol, raffinose, and inulin.

Summarizing the above characteristics of No. M480–M1 the strain belongs to the genus Streptomyces and chromogenic type, and the production of brown soluble pigment on nutrient agar is poor. Aerial mycelium forms neither whorls nor spirals. The spore surface is smooth. The growth on various media is found to be greenish gray in general and the aerial mycelium is colored white to gray or brownish white. No soluble pigment is formed on synthetic media but brown soluble pigments frequently are formed on organic media. Nitrate is reduced to nitrite. The proteolytic action is relatively weak. Starch is hydrolyzed.

Among known species of Streptomyces, strain No. M480–M1 resembles *Streptomyces lydicus* De Boer et al. However, *S. lydicus* forms buff to olive-tan growth, and forms no melanin pigment differentiating it from strain No. M480–M1. Furthermore, the antibiotic, macromomycin produced by strain No. M480–M1, is different from streptolydigin produced by *S. lydicus*. Macromomycin is related in nature to neocarzinostatin produced by *S. carzinostaticus* but *S. carzinostaticus* is clearly differentiated from *S. macromomyceticus* by its characteristics, such as the hairy structure of the spore surface of *S. carzinostaticus*.

Thus, strain No. M480–M1 is a new microorganism different from known species of Streptomyces and designated *Streptomyces macromomyceticus* n. sp. Hamada et Okami.

It is to be understood that since the Streptomyces are easily mutatable naturally or artificially, *S. macromomyceticus* in the present invention includes the typical strain described above and all natural and artificial variants and mutants thereof. That is, by definition *Streptomyces macromomyceticus* of the present invention includes all strains producing macromomycin except those which produce macromomycin and which can be absolutely differentiated therefrom.

*Streptomyces macromomyceticus* when grown under suitable conditions produces macromomycin. A fermentation broth containing macromomycin is prepared by inoculating spores or mycelia of the macromomycin-producing organism into a suitable medium and then cultivating under aerobic conditions. For production of macromomycin, cultivation on a solid medium is possible, but for production of large quantities of the antibiotic cultivation in a liquid medium is preferred. Any fermentation temperature can be employed within the range in which the macromomycin-producing organism can grow, although 27° C.–30° C. is preferred. Media consisting of known kinds of nutritional sources for actinomycetes are useful for the production of macromomycin. For example, for the production of macromomycin, commercially available products such as glycerol, glucose, starch, dextrin, maltose, lactose, sucrose, molasses, oil, fats, lipids and the like are useful as the carbon sources in either purified or crude state. Commercially available products such as soybean meal, meat extract, peptone, yeast extract, distiller's solubles, peanut powder, cotton seed powder, fish powder, corn steep liquor, casein, nitrates, ammonium salt, urea and the like are useful as the nitrogen source. Inorganic salts such as sodium chloride, potassium chloride, magnesium chloride, calcium carbonate, phosphate or other salts, and a small amount of heavy metal salts such as copper, manganese, iron, zinc and the like are added, if desired. Any materials which are useful for the growth of Streptomyces can be used. Antifoam agents such as silicone oil, soybean oil, fat or other agents which are useful in processes for the production of penicillin or streptomycin can also be employed.

Unless it is specified, the method of cultivation and the assay method are as follows:

(1) Shaking flask culture: 125 cc. of medium in a flask of 500 cc. volume is sterilized at 120° C. for 20 minutes. Spores or mycelia of the macromomycin-producing organism are inoculated into the sterilized medium and cultivated at 27° C. for 48 hrs. on a reciprocal shaking machine (130 strokes per minute, 8 cm. amplitude). 2 cc. of the cultured broth is used as inoculum for new medium prepared in the same way as above.

(2) Tank culture: 40 liters of medium is prepared in a 70 liter fermentor and sterilized at 120° C. for 30 minutes. The sterilized medium is inoculated with 800 cc. cultured broth which was previously shake-cultured for 2 days. The fermentation in the tank proceeds under aeration of 40 liters sterile air per minute, with stirring at 300 r.p.m. Silicone oil and soybean oil are used for antifoaming.

(3) Assay of macromomycin: Macromomycin exhibits an inhibition zone on an agar plate inoculated with *Micrococcus flavus*. As in the penicillin assay, unknown units of macromomycin are determined by the cylinder plate method using certain units of macromomycin as the standard. The standard macromomycin is standardized as 4.4 units/mg. The medium for the assay consists of 0.6% peptone, 0.4% casamino acid, 0.15% meat extract, 0.1% glucose, 0.3% yeast extract, and 1% agar and is adjusted to pH 7.0. To 100 cc. of this melted agar medium, 0.1 cc. of the cultured inoculum broth of *Micrococcus flavus* which was previously shake-cultured for 48 hrs. in a flask of 100 cc. volume containing sterilized medium consisting of 1% meat extract, 2% glucose, 1% peptone and 0.3% sodium chloride (pH=7.0) was added, and it was used for preparation of the seed layer.

The macromomycin-producing strain was first shake-cultured in the following medium.

The medium consisted of 1% glucose, 1% starch, 1.5% soybean meal (Prorich, the product of Ajinomoto Co.), 0.1% $KH_2PO_4$, 0.1% $MgSO_4 \cdot 7H_2O$, 0.3% NaCl, 0.0007% $CuSO_4 \cdot 5H_2O$, 0.0001% $FeCl_3 \cdot 6H_2O$, 0.0008%

$$MnCl_2 \cdot 4H_2O$$

and 0.0002% $ZnSO_4 \cdot 5H_2O$, and adjusted to pH 7.0.

The cultured broth(pH 7.0) at the 4th day exhibited an inhibition diameter of 24.0 mm. on the plate inoculated with *Micrococcus flavus*.

Macromomycin was produced in media containing various carbon and nitrogen sources under shaking conditions as shown by examples described as follows:

(1) Various carbon sources were added to the basal medium consisting of 2% soybean meal and 0.2% NaCl.

|  | Macromomycin present at indicated time ||||||||||
|  | 2 days || 3 days || 4 days || 5 days || 6 days ||
|  | pH | Units | pH | Units | pH | Units | pH | Units | pH | Units |
|---|---|---|---|---|---|---|---|---|---|---|
| 2% glycerol | 5.8 | 0.32 | 5.8 | 1.0 | 6.4 | 2.4 | 7.0 | 2.4 | 8.2 | 2.4 |
| 2% lactose | 7.2 | 0.20 | 8.2 | 2.3 | 8.2 | 2.3 | 8.2 | 0.8 | 8.6 | 0 |
| 1% starch plus 1% glucose | 4.2 | 0.23 | 6.0 | 1.20 | 7.0 | 3.8 | 7.2 | 2.8 | 8.0 | 2.2 |
| 2% glucose | 4.8 | 0.20 | 4.8 | 0 | 5.0 | 0 | 5.8 | 0 | 6.8 | 0 |
| 2% starch | 5.8 | 0.48 | 6.4 | 1.2 | 6.8 | 1.6 | 7.2 | 2.9 | 7.4 | 2.0 |

(2) The basal medium containing 1% glucose, 1% starch and 0.3% NaCl was used.

|  | Macromomycin present at indicated time ||||||||||
|  | 2 days || 3 days || 4 days || 5 days || 6 days ||
|  | pH | Units | pH | Units | pH | Units | pH | Units | pH | Units |
|---|---|---|---|---|---|---|---|---|---|---|
| 0.75% meat extract, 0.75% peptone | 5.6 | 0.52 | 6.0 | 0.1 | 7.0 | 0.3 | 7.4 | 0 | 8.2 | 0 |
| 1% N-Z-amine, 0.2% yeast extract | 6.0 | 0.45 | 6.2 | 0 | 7.2 | 0 | 8.0 | 0 | 8.0 | 0 |
| 2% soybean meal | 5.8 | 0.24 | 6.0 | 1.0 | 7.0 | 3.8 | 7.2 | 2.8 | 8.0 | 2.2 |
| 2% corn steep liquor | 4.2 | 0.45 | 4.4 | 0 | 4.6 | 0 | 4.6 | 0 | 4.8 | 0 |

The above results are merely examples, and it can be said that carbon sources such as starch, glucose or lactose are favorable for the production of macromomycin and nitrogen sources such as soybean meal, meat extract, peptone, N-Z-amine, yeast extract or corn steep liquor are examples of suitable nitrogen sources.

The medium consisting of 1% starch, 1% glucose, 1.5% soybean meal, 0.1% $KH_2PO_4$, 0.1% $MgSO_4 \cdot 7H_2O$, 0.0007% $CuSO_4 \cdot 5H_2O$, 0.0001% $FeSO_4 \cdot 7H_2O$, 0.0008% $MnCl_2 \cdot 4H_2O$ and 0.0002% $ZnSO_4 \cdot 5H_2O$ (pH=7.0) is one of the media suitable for the production of macromomycin.

In general, macromomycin is poorly produced in synthetic media, and produced well in a medium containing natural carbon and nitrogen sources. The pH at the maximum production varies depending on compositions of media employed.

As with the known antibiotics it is anticipated that higher production of macromomycin can be achieved by the selection of highly productive strains after single colony selection, or by the treatment of a macromomycin-producing strain with various mutagens such as ultraviolet light, X-ray or chemical mutagens.

Macromomycin exists mainly in the liquid part of the fermented broth after separation of the solid part by filtration or centrifugation. The liquid part is adjusted to pH 3.8 by the addition of an acid, and the resulting precipitate is removed by filtration or centrifugation. A filter aid such as diatomaceous earth is helpful for filtration. Thereafter, the liquid phase is neutralized by alkali such as sodium hydroxide or aqueous ammonia and precipitated by addition of salting out agents such as ammonium sulfate. The material containing macromomycin and salts can be dialyzed by a semipermeable membrane such as a cellophane tube to remove permeable impurities. The solution containing macromomycin can be passed through an ion exchange resin such as chlorinated type of Dowex 1X2 or IRA-400 or through a small amount of active carbon to remove impurities. The passed liquid is concentrated by evaporation under vacuum or lyophilization.

The concentrates obtained are treated with an ion exchange resin such as Dowex 3, IR-45, Dowex 1 or IRA-400 and the passed solution containing macromomycin can be further purified by passing it through Sephadex, dextran gel or starch gel.

Macromomycin can be adsorbed on an ion exchanger such as DEAE-Sephadex, DEAE-Cellulose, CM-Sephadex or CM-Cellulose, and eluted with a neutral salt solution. The fractions containing macromomycin are concentrated to dryness by lyophilization.

The antibacterial specrum of macromomycin was determined by the agar dilution method as follows:

ANTIBACTERIAL SPECTRUM OF MACROMOMYCIN

| Test organism: | Minimum inhibitory concentration (mcg./ml.) |
|---|---|
| *Staphylococcus aureus* FDA 209P parent | 1.56 |
| *Staphylococcus aureus* FDA 209P resistant to streptomycin and streptothricin | 1.56 |
| *Staphylococcus aureus* FDA 209P resistant to actinomycin | 1.56 |
| *Staphylococcus aureus* FDA 209P resistant to bryamycin | 1.56 |
| *Staphylococcus aureus* FDA 209P resistant to movobiocin | 1.56 |
| *Staphylococcus aureus* FDA 209P resistant to kanamycin | 0.78 |
| *Staphylococcus aureus* 52-43 parent | 3.12 |
| *Staphylococcus aureus* 52-53 resistant to erythromycin, tetracycline and carbomycin | 1.56 |
| *Staphylococcus aureus* 193 parent | 1.56 |
| *Staphylococcus aureus* 193 resistant to erythromycin | 0.78 |
| *Staphylococcus aureus* 308A-1 parent | 3.12 |
| *Staphylococcus aureus* 308A-1 resistant to enduracidin | 0.78 |
| *Staphylococcus aureus* Terajima | 1.56 |
| *Staphylococcus aureus* Smith | 1.56 |

ANTIBACTERIAL SPECTRUM OF MACROMOMYCIN

| Test organism: | Minimum inhibitory concentration (mcg./ml.) |
|---|---|
| Sarcina lutea PCI 1001 | 0.39 |
| Micrococcus flavus | 0.39 |
| Bacillus anthracis | 3.12 |
| Bacillus cereus | 1.56 |
| Bacillus subtilis PCI 219 | 0.78 |
| Bacillus subtilis NRRL 558 | 0.78 |
| Escherichia coli NIHJ | >100 |
| Escherichia coli K-12 | >100 |
| Klebsiella pneumoniae PCI 602 | >100 |
| Proteus vulgaris Ox 19 | >100 |
| Salmonella enteritidis | >100 |
| Pseudomonas aeruginosa $A_3$ | >100 |
| Shigella flexneri la EW8 | >100 |
| Serratia marcescens | >100 |
| Gibberella fujikuroi[1] | >100 |
| Gloeosporium kaki[1] | >100 |
| Glomeralla lagenarium[1] | >100 |
| Helminthosporium sesameum[1] | >100 |
| Ophiobolus miyabeanus[1] | >100 |
| Pellicularia filamentosa[1] | >100 |
| Pyricularia grisea[1] | >100 |
| Abisidia spinosa[1] | >100 |
| Xanthomonas oryzae[1] | >100 |
| Pyricularis oryzae[1] | >100 |
| Pyricularis oryzoe[1] | >100 |
| Candida tropicalis[1] | >100 |
| Candida pseudotropicalis[1] | >100 |
| Candida YU-1200[1] | >100 |
| Candida albicans 3147[1] | >100 |
| Candida krusei[1] | >100 |
| Saccharomyces cerevisiae[1] | >100 |
| Torula utilis[1] | 1.56 |
| Botrytis bassiana[1] | >100 |
| Cryptococcus neoformans[1] | 12.5 |
| Pesudomonas fluorescens[1] | >100 |
| Helminthosporium oryzae[1] | >100 |
| Trichophyton mentagrophytes[1] | >100 |
| Aspergillus niger[1] | >100 |
| Trichophyton asteriodes[1] | >100 |
| Penicillium chrysogenum[1] | >100 |
| Penicillium lilacinum 8021[1] | >100 |
| Colletotrichum phomoides[1] | >100 |
| Fusarium lini[1] | >100 |
| Fusarium oxysporum[1] | >100 |
| Gibberella saubinetii[1] | >100 |
| Mycobacterium 607[2] | >100 |
| Mycobacterium phlei[2] | >100 |

[1] 1% glycose nutrient agar used.
[2] 1% glycerol nutrient agar used.
NOTE: Nutrient agar was used for other test organisms.

When macromomycin of 2 units/mg. was administered to mice at a dose of 125 mg./kg. intraveneously, no toxicity was observed. When macromomycin of 1.7 units/mg. was injected in Ehrlich ascites and Sarcoma 180 tumor bearing mice, the administration of 7.8–3.9 mcg./mouse/day inhibited Ehrlich ascites tumor and Sarcoma 180 in mice, and that of 500 mcg./mouse/day showed no toxic signs in mice. The administration of 15.6 mcg./mouse/day prolonged survival time of mice bearing leukemia L-1210 at the rate of 150%, comparing with control mice receiving no macromomycin, and that of 500 mcg./mouse/day produced no toxic signs in leukemia L-1210 tubor bearing mice.

Because of the low toxicity, strong antibacterial activity of macromomycin, macromomycin is useful for the treatment of bacterial disease and for disinfecting. In addition, it is promising as a useful additive to feed, because it is a high molecular weight and is not adsorbed by feed.

Among known antibiotics, neocarzinostatin and marinamycin are non-dialyzable polypeptides having antitumor and antibacterial activity. Macromomycin is clearly differentiated from the above antibiotics as follows: When standard samples of neocarzinostatin and macromomycin were subjected to electrophoresis (450 v., 4.5 hours.) using barbital buffer (pH 8.6, $\mu$=0.05), macromomycin moved 2.0 cm. toward the cathode but neocarzinostatin moved 5.6 cm. In addition, amino acid analysis of neocarzinostatin showed no histidine, but macromomycin contained histidine. Ultracentrifugation gave $SW_{20}$ value of 1.44 and 1.27 for neocarzinostatin and macromomycin respectively. Macromomycin inhibits Staphylococci, but neocarzinostatin does not. Marinamycin was able to pass through exchange resins of strong acidic ion, whereas macromomycin was not. Macromomycin showed substantial maximal absorption in the ultraviolet spectrum, whereas marinamycin did not.

As the results above show, macromomycin is clearly different from neocarzinostatin and marinamycin, and it is differentiated from known antibiotics in respect of its strong antibacterial activity and its high molecular weight.

The following examples are merely illustrative and it should be understood that our invention is not limited to these examples.

EXAMPLE 1

A medium (125 ml.) consisting of glucose 1%, starch 1%, soybean meal (Prorich, the product of Ajinomoto Co.) 1.5%, $KH_2PO_4$ 0.1%, NaCl 0.3%, $MgSO_4 \cdot 7H_2O$ 0.1%, $CuSO_4 \cdot 5H_2O$ 0.0007%, $FeSO_4 \cdot 7H_2O$ 0.0001%, $MnCl_2 \cdot 4H_2O$ 0.0008%, and $ZnSO_4 \cdot 5H_2O$ 0.0002% (pH 7.0) was placed in a shaking flask of 500 ml. volume and sterilized at 120° C. for 20 minutes. To this sterilized medium, the M480–M1 strain of Streptomyces macromomyceticus was inoculated from an agar slant culture by platinum loop. Incubation proceeded on a reciprocal shaking machine for 2 days at 27° C. An inoculum of 2 cc. of the broth was used for the next culture. Eightly flasks containing the medium which was prepared as above were inoculated as above and shake-cultured at 27° C. for 4 days and yielded 9.0 liters of broth (pH 7.0). The broth thus obtained was adjusted to pH 3.8 with 0.1 N HCl and the precipitate formed was filtered. The filtrate was neutralized with 0.1 N NaOH and the precipittae filtered off. To this filtrate, 90 ml. of 50% zinc chloride solution was added and the precipittae was removed by filtration. Thus, 7.5 liters of clear filtrate containing 1862 mg. of macromomycin was obtained.

To this filtrate of 7.5 liters, 5 kg. of ammonium sulfate was added and stirred frequently at 5° C. for 3 hours. The precipitate containing macromomycin was collected by centrifugation at 4–5° C. and dissolved in 160 ml. of deionized water. This solution contained 1408 mg. of macromomycin.

This solution was dfivided into three portions and placed in cellpophane tubes of 4.4 cm. in diameter and 50 cm. in length. Then, they were dialyzed against tap water for 12 hrs. The inner solution of 520 cc. contained 1350 mg. of macromomycin.

Five hundred cc. of this inner solution was applied to a column of 6.4 cm. in diameter and 60 cm. in length filled with chlorinated type of Dower 1×2 (50–100 mesh). After washing the column with 2.0 liters of deionized water, an active fraction of 1830 cc. containing 778 mg. macromomycin was obtained. To this active fraction, 1.1 kg. of ammonium sulfate was added and the precipitate produce was collected. The precipitate was dissolved in 80 cc. of deionized water and dialyzed in a cellophane tube of 3.2 cm. in diameter and 80 cm. in length. After 12 hours dialysis, 132 ml. of the inner solution contained 580 mg. of macromomycin. This inner solution was applied to a column of 5.3 cm. in diameter and 100 cm. in length filled with 2.0 liters of Sephadex G-25, and chromatographed with deionized water. The active fraction of 340 cc. contained macromomycin and was lyophilized. Crude macromomycin powder of 434 mg. thus obtained was shown to be of 60% purity.

Two hundred and seventeen mg. of this crude powder was dissolved in deionized water and chromatographed with a column of 3.5 cm. in diameter and 170 cm. in length filled with 1.0 liter of Sephadex G–50. The active fraction of 270 cc. was lyophilized and yielded 110 mg. of pure macromomycin.

EXAMPLE 2

Crude powder (100 mg., 600 mcg./mg.) obtained in Example 1 was dissolved in 20 ml. of deionized water and chromatographed with a column of 3.5 cm. in diameter and 70 cm. in length filled with 400 cc. of Sephadex G–100. Each 10 cc. of effluent was measured by ultraviolet absorption at 280 m$\mu$ and the active fraction of 120 cc. was obtained and lyophilized. Fifty mg. of pure macromomycin was obtained.

EXAMPLE 3

Crude powder (100 mg., 600 mcg./mg.) obtained in Example 1 was dissolved in 50 cc. of deionized water and applied to a column of 4.5 cm. in diameter and 60 cm. in length filled with chlorinated type of an ion exchange resin, Dowex 1×2. After the column was washed with 1000 cc. of deionized water, it was eluated with 1500 cc. of 1 molar NaCl and an active fraction of 500 cc. was obtained. This active eluate of 500 cc. was dialyzed to remove NaCl and the inner solution was concentrated to 50 cc. by freeze-drying. This concentrate was chromatographed with a column of Sephadex G–50 and the active fractions were measured in the same way as in Example 2. The active fraction of 150 cc. was lyophilized and 43 mg. of pure macromomycin was obtained.

EXAMPLE 4

Thirty-five liters of the medium of the same compositions as described in Example 1 was added with 0.01% silicone oil to a 70 liter stainless steel tank and sterilized. Three hundred and fifty cc. of a 2 days culture of *Streptomyces macromomyceticus* strain M480–M1 which had been prepared in the same way as Example 1 was inoculated into the medium. The fermentation proceeded at 27° C. for 72 hrs. with aeration at the rate of 35 liters sterile air per minute and with stirring at 350 r.p.m. The pH of the broth reached 7.2 and the broth contained 200 mcg. of macromomycin per ml. About 33 liters of the broth were mixed with 500 g. of Hyflo-Super Cell (The product of Johns-Manville) and filtered. The clear filtrate of 28 liters contained 5.6 g. of macromomycin.

Aqueous solutions of macromomycin are useful for disinfecting various bacterial contaminated equipment. Such solutions should contain at least about the minimum inhibitory concentration of micromomycin for the particular bacterium desired to be removed and preferably several times the minimum inhibitory concentration.

While this invention has been described and exemplified in terms of its preferred embodiment, those skilled in the art will appreciate that modifications can be made without departing from the spirit and scope of the invention.

We claim:
1. The antibiotic macromomycin which:
   (a) is effective in inhibiting the growth of *Staphylococcus aureus, Bacillus subtilis, Sarcina lutea*, ascites forms of Ehrlich carcinoma, Sarcoma 180 and leukemia L–1210;
   (b) is soluble in water but substantially insoluble in organic solvents;
   (c) exhibits ultraviolet absorption maxina at 280 m$\mu$ in aqueous solution with a shoulder at 290 m$\mu$;
   (d) exhibits characteristic bands in the infrared adsorption spectrum at 3350, 3100, 3000, 1660, 1540, 1460, 1400, 1240, 1140, 1100 and 930 cm.$^{-1}$;
   (e) has an optical rotation of $[\alpha]_D^{20}+119°$ in 1% aqueous solution;
   (f) decolorizes potassium permanganate, and gives positive Folin-Lowry, xanthoprotein, Ehrlich, Sakaguchi, and biuret reactions, weakly positive ninhydrin reaction, and negative Anthrone, Molish, Benedict, Tollens and ferric chloride reactions;
   (g) has the following elemental analysis: C, 43.89%; H, 11.55%; N, 13.46%; S, 2.39%; O, 23.76%;
   (h) is a high molecular weight peptide for which a molecular weight of 15,000 is indicated by ultracentrifugation analysis;
   (i) gives by hydrolysis the following amino acids: lysine, histidine, aspartic acid, threonine, serine, glutamic acid, proline, glycine, alanine, cystine, valine, isoleucine, tyrosine and phenylalanine; and
   (j) moves about 2.0 cm. to the cathode during paper electrophoresis at 450 v. for 4.5 hours using barbitol buffer of pH 8.6.

2. The process for the production of the antibiotic, macromomycin, which comprises cultivating *Streptomyces macromomyceticus* NIHJ MC–8–42 in an aqueous carbohydrate solution containing a nitrogenous nutrient under submerged aerobic conditions until substantial antibacterial activity is imparted to said solution and then recovering said macromomycin from said solution.

3. The process of claim 2 wherein the antibiotic macromomycin is recovered from an aqueous solution thereof by addition of ammonium sulfate to said solution to precipitate said antibiotic.

4. The process of claim 2 wherein the antibiotic macromomycin is separated from small molecular impurities by dialysis against water.

References Cited

Chimura et al.: J. of Antibiotics, vol. 21, No. 1, January 1968, pp. 44–49.

JEROME D. GOLDBERG, Primary Examiner

U.S. Cl. X.R.
195—80